March 28, 1939.  P. ONORATO ET AL  2,152,082
POULTRY BLEEDING AND STEAMING MACHINE
Filed Oct. 3, 1934   2 Sheets-Sheet 2
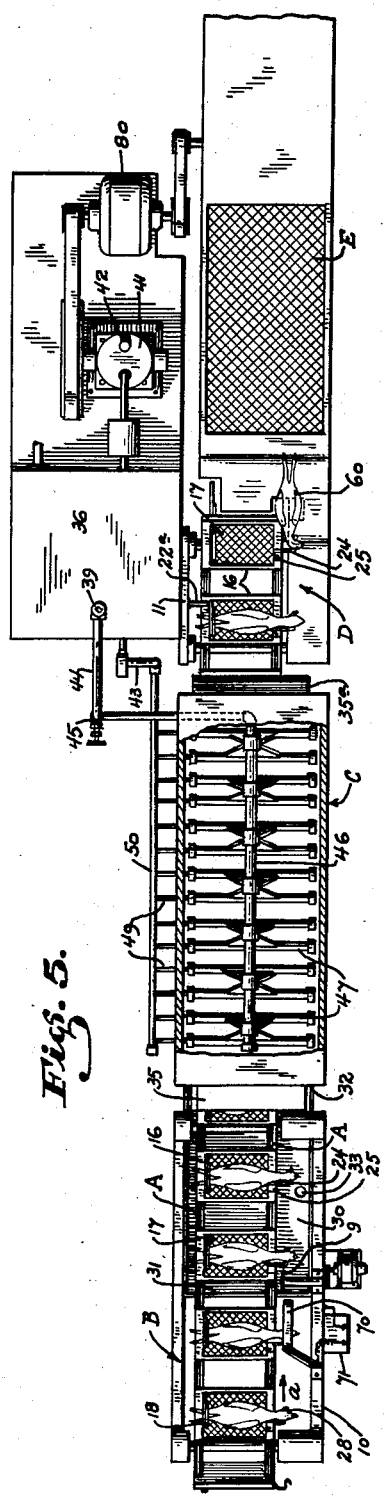
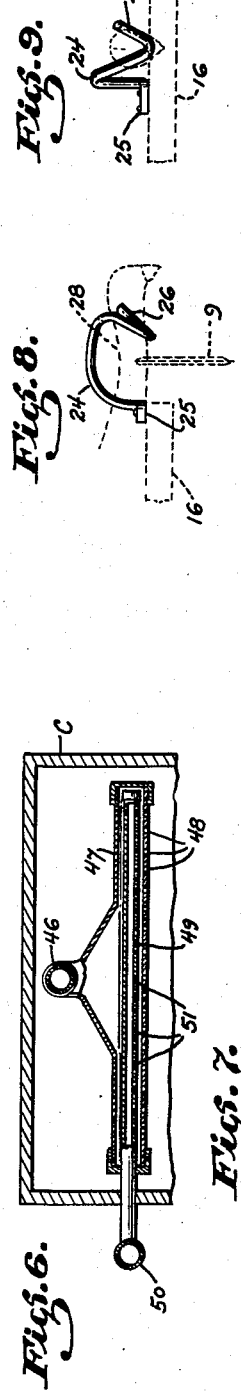
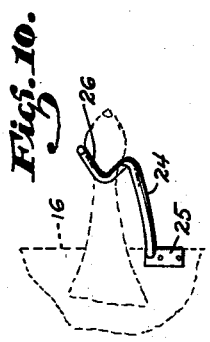
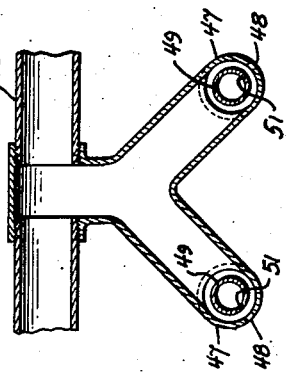
INVENTORS.
Paul Onorato,
Emile Weinaug,
BY Townsend and Loftus
ATTORNEYS.

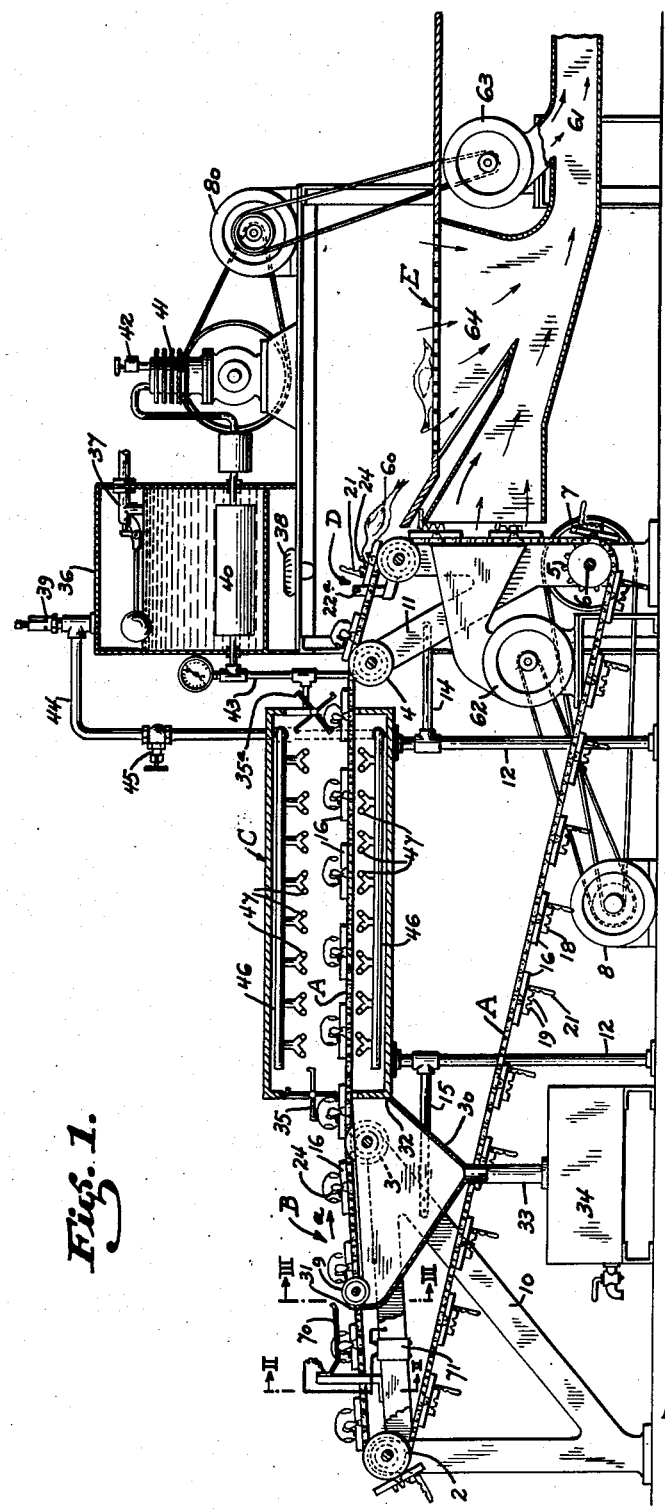

Patented Mar. 28, 1939

2,152,082

UNITED STATES PATENT OFFICE 2,152,082

POULTRY BLEEDING AND STEAMING MACHINE

Paul Onorato, San Mateo, and Emile Weinaug, San Francisco, Calif.

Application October 3, 1934, Serial No. 746,680

1 Claim. (Cl. 17—11)

This invention relates to a machine for bleeding and steaming chickens and like fowl prior to the picking or removal of the feathers.

In the preparation of poultry for the market it is necessary to bleed them and to pick or otherwise remove the feathers. This preparatory work is usually accomplished by manual labor or handwork and consists in cutting the throats with a sharp knife, holding the birds after the throat is cut to permit thorough bleeding, and then dipping the birds into substantially warm water to loosen the feathers, and finally picking or otherwise removing the feathers after the dipping operation.

The workers employed usually work on piecework and hurry the operations as much as possible, with the result that during the bleeding operation the birds are not always thoroughly bled. Furthermore, during the bleeding operation the birds struggle and flap about, causing the blood to spatter on the feathers, rendering them substantially worthless as a by-product, and also causing considerable contamination and loss of blood which could be saved and used as another by-product. The dipping operation usually takes place in a large vat or tank in which the water is maintained at about boiling temperature. There may be a thousand or more birds dipped in the tank before the water is changed and it obviously becomes absolutely filthy and stinking before a change, if any, is made. Also, the dipping operation takes place immediately after the bleeding, that is, before muscle contraction ceases, and as a result the lungs of the birds often become filled with the dirty water bringing about a condition which is anything but sanitary.

The object of the present invention is to prepare poultry for the market in a clean sanitary manner; to employ machinery whereby all operations except that of picking or removing the feathers may be rapidly and economically accomplished and whereby the blood and feathers may be saved and sold as commercial by-products; and further, to provide a machine which cuts the throats and insures thorough bleeding of the birds and in which the feathers are loosened by jets of steam and air in such a manner that perfect sanitation is maintained and any danger of water entering the lungs is entirely eliminated.

The machine whereby the several operations are accomplished is shown by way of illustration in the accompanying drawings, in which—

Fig. 1 is a side elevation of the machine partially in section.

Fig. 2 is a cross section of the machine taken on line II—II of Fig. 1.

Fig. 3 is a cross section on line III—III of Fig. 1.

Fig. 4 is an end view of the lever whereby the legs of the bird are secured in the conveyor.

Fig. 5 is a plan view of the machine partially broken away.

Fig. 6 is a partial cross section of the steam box showing the manner in which the steam and air are delivered to the jets or nozzles.

Fig. 7 is a cross section of a pair of jets.

Fig. 8 is a side elevation of the hook whereby the head of a bird is secured to the conveyor.

Fig. 9 is a front view of the hook.

Fig. 10 is a plan view of the hook.

Referring to the drawings in detail, and particularly Fig. 1, A indicates a pair of spaced sprocket chains forming an endless conveyor. The chains are carried by pairs of sprocket wheels, indicated at 2, 3, 4, and 5, of which 5 are the driving sprockets as they are secured to a shaft 6 which carries a pulley 7 driven by a motor 8. The conveyor during its travel passes over a table B, at the forward end of which the birds are applied and secured to the conveyor, and after the birds have been applied they are electrically stunned, their throats are cut by a revolving knife 9, and they are bled. This all takes places while the conveyor travels over the table B. thereafter the conveyor enters a steaming box, generally indicated at C, where the feathers are loosened by jets of steam, said steam being projected from different angles into and between the feathers of the birds, and finally the conveyor passes out of the box and over a table D where the birds are automatically released from the conveyor and delivered by gravity to a table E where the feathers are removed by hand picking, or otherwise.

The pairs of sprocket wheels, indicated at 2 and 3, are journaled on cross shafts mounted in the frame 10. A somewhat similar frame 11 supports the sprocket gears 4 and 5 and uprights or posts 12 support the steaming box, the uprights 12 being connected with the frames 10 and 11 through brace arms 14 and 15. The sprocket chains forming the conveyor A are spaced apart, as shown in Figs. 2 and 3. Suitably secured between the chains forming the conveyor are frames 16 constructed of angle iron and the like, and covering the frames is a wire mesh 17 upon which the birds to be handled are placed.

At one end of each frame is secured a bar 18 having a pair of recesses 19 formed therein to receive the legs of a bird. Pivotally attached to the member 18, as at 20, is a clamping lever 21. This lever is folded down against the bar 18 when the legs of the bird are placed in the notches or recesses 19, and as such grasps or secures the legs therein, and the clamping lever is secured when in clamping position by a pawl 22 which engages ratchet teeth 23 forming part of the bar 18.

The head of the bird must also be secured when it is placed on one of the frames and this is accomplished by employing a hook such as shown in Figs. 8, 9 and 10. The hook consists of a wire arm, or the like, indicated at 24 secured to the frame, as at 25. It extends outwardly a considerable distance and terminates in a V-shaped hook 26. This hook passes under and behind the head of the bird, see Figs. 8, 9 and 10, and thoroughly secures the head against removal when a pull is exerted on the legs and they are secured by the clamping lever 21.

The arm 24, as previously stated, is fairly long. The head of the bird thus projects over the side of the conveyor and the throat, indicated at 28, becomes exposed and as the conveyor travels in the direction of arrow a, the throat will come in contact with the revolving knife 9 and is thus cut. A trough 30 extends from the point 31 to 32 and this is connected through a pipe 33 with a tank 34. The throat is cut at the point 31 by the knife 9 and the bird is thus given an opportunity to thoroughly bleed while traveling from the point 31 to 32, where it enters the steam box C. The steam box is provided with a revolving entrance shutter 35 which is rotated a quarter revolution as each bird enters. The moment a bird enters it is subjected to a steaming action as jets of steam and air are blown against the bird both from above and below the conveyor, as clearly shown in Fig. 1. This steaming operation is important and is accomplished as follows:

By referring to Fig. 1, it will be noted that a steam boiler 36 has been provided. This is provided with a float actuated valve 37 and a predetermined water level is automatically maintained. A gas burner 38 is mounted below the boiler and this maintains the water at boiling temperature and any pressure desired may be maintained, for instance, 3, 4, 5 pounds, as desired; the pressure being automatically regulated by a safety or escape valve indicated at 39 of standard construction. Mounted within the boiler is an air heating tank 40 which is connected with an air compressor 41. This air compressor is provided with a valve 42 at the intake and by regulating this valve the amount of air compressed and delivered to the tank 40 may be regulated. The air entering the tank is heated by the surrounding boiling water and is therefore directed through a pipe 43 to the nozzles in the steam box. These are best illustrated in Figs. 5, 6 and 7.

The steam pressure in the boiler is controlled by the valve 39 and passes through a pipe 44 on which is mounted a regulating valve 45. The other end of the pipe connects with a manifold 46 on which is mounted a series of nozzles 47. These extend crosswise of the box and are provided with a series of nozzle openings 48. Extending into each nozzle is an air pipe 49 connected with a manifold 50 which, in turn, is connected with the heating tank 40. The heated air discharges from the pipe 40 through perforations 51 which align with the nozzle openings 48, and a mixture of heated air and steam will thus discharge through the nozzle openings and against and between the feathers of the birds. Steam alone has a tendency to scald the birds; but by mixing the steam with air, as here illustrated, and by controlling the temperature of the air and the pressure thereof it is possible to produce almost any temperature condition desired and it is also possible to project the water vapor or steam with any force desired. By regulating the pressure of the air the pressure of the steam need not be very great as it is projected by means of the air pressure. In this manner the feathers can be thoroughly loosened without danger of blistering or scalding the birds and it will also be noted that the operation is entirely sanitary as the water vapor or steam is not used over and over again, as is the boiling water of a dipping vat.

It might be said that in this case a continuous supply of clean water is used when comparison is made with the old dipping method. Furthermore, by using the water in the form of steam or vapor there is no tendency for water to enter the lungs and the keeping qualities are obviously materially improved and sanitation maintained at a point almost of perfection. The several nozzles are arranged on an angle and they are disposed both above and below the conveyor so it can be seen that as the birds advance through the steam box the jets will impinge on them from almost every angle, thus insuring thorough loosening of the feathers.

After traveling through the steam box they pass out through a revolving shutter 35a and on to the table D. A rod 22a disposed at one side of the conveyor will here engage with the latch 22 and release the same with relation to the teeth 23. A spring 21a positioned adjacent the pivotal point of the lever 21 will swing the lever about its pivot and the legs of the bird will be thus released, and as the table D is disposed on a considerable incline the birds will swing around by gravity action, as shown at 60 in Fig. 1, and in so swinging will become released from the hook 26 or may be lifted clear of the same and deposited upon the table E. This table is perforated as shown. Pickers are stationed on opposite sides of the table and as they remove the feathers the latter are sucked downwardly and discharged through a conduit at 61, the suction action being maintained under the table by jets of air issuing from the blowers indicated at 62 and 63. The air from the blower 62 passes below and under a hopper 64 receiving the feathers from the table E, and the blower 63 discharges into the conduit 61 on an angle thereto so as to produce a further suction action.

The air employed may be heated so as to dry the feathers during their passage through the conduit, or the feathers may be blown into a drier of any suitable character where they are recovered. The steaming operation while the birds pass through the steaming box has already sterilized them, but if it is desired to wash and further clean the feathers, it may be accomplished by passing the feathers first through a washer and then through a drier of any suitable character. Thus all the feathers are saved and so is the blood. The blood is clean and is not contaminated as the birds are rigidly held on the conveyor and cannot thrash about during the bleeding operation. Furthermore, the bleeding operation is thorough and the greatest quantity of blood is thus obtained and saved.

If it is desired, it is possible to electrically stun the birds before their throats are cut with the knife 9. This is accomplished by placing a contact arm 70 at one side of the conveyor at a point where it will engage the combs or the top portion of the heads of the birds as they are moved along by the conveyor. The contact arm 70 is connected with a high tension transformer 71 supplied with current from any suitable source and the shock or jolt given the bird should be sufficient to stun it. In connection with the electric contact arm 70, it will be understood that this is connected with one side of the transformer while the frame of the machine is connected with the other side of the transformer so that a circuit will be established through the head of the bird when contact is made with the arm 70. Thus the machine is not only humane but it is also sanitary in every sense of the word. It saves the valuable by-products, such as blood and feathers; it reduces hand labor to a minimum as the workers employed have only one duty to perform and that is the picking or removing of the feathers and as these have been thoroughly loosened by the combined action of steam and air, they can be quickly and readily removed and as they are removed they are withdrawn from the table by the suction action. The only other labor involved in connection with this machine is that of placing the birds on the frames carried by the conveyor, and as this is quickly and readily accomplished the cost for such labor will be insignificant.

The motor indicated at 8 serves two functions, first that of driving a conveyor through the pulley 7 and the sprockets 5, and its second function is that of driving the blower 62. The blower 63 is driven from the motor indicated at 80 and this motor also serves as a drive for the compressor shown at 41.

While certain features of the present invention are more or less specifically described, we wish it understood that various changes may be resorted to within the scope of the appended claim. Similarly, that the materials and finish of the several parts employed may be such as the manufacturer may decide, or varying conditions or uses may demand.

Having thus described our invention, what we claim and desire to secure by Letters Patent is:

In a machine of the character described a conveyor comprising a pair of spaced endless sprocket chains, a plurality of screen covered frames secured to the chains and disposed crosswise thereof, a clamp at one end of each frame to secure the legs of a bird, means at the opposite end of each frame for receiving and securing the head of each bird, means for cutting the throats of the birds to bleed them as they are carried along by the conveyor, a steaming box through which the conveyor and the birds placed thereon pass after the birds have been bled, a plurality of nozzles in the box above and below the conveyor, and means for releasing the birds from the conveyor after passage through the steaming box.

PAUL ONORATO.
EMILE WEINAUG.